United States Patent [19]

Doversberger

[11] 4,012,082
[45] Mar. 15, 1977

[54] CONTROL CIRCUIT FOR ANTI-SKID HYDRAULIC BRAKING SYSTEM

[75] Inventor: Richard A. Doversberger, Peoria, Ill.

[73] Assignee: Westinghouse Air Brake Company, Pittsburgh, Pa.

[22] Filed: Oct. 22, 1975

[21] Appl. No.: 624,715

[52] U.S. Cl. .............................................. 303/116
[51] Int. Cl.² ...................................... B60T 8/087
[58] Field of Search .................. 188/181 A, 181 C; 303/6 R, 10, 11, 116

[56] References Cited

UNITED STATES PATENTS

| | | | |
|---|---|---|---|
| 2,869,687 | 1/1959 | Keim et al. | 303/21 FP |
| 3,004,801 | 10/1961 | Wrigley | 303/21 FP |
| 3,093,153 | 6/1963 | Horowitz | 303/69 X |
| 3,264,040 | 8/1966 | Brueder | 303/6 R |
| 3,721,475 | 3/1973 | Kawase et al. | 188/181 A X |
| 3,881,783 | 5/1975 | Shiber | 303/21 FP |

*Primary Examiner*—George E. A. Halvosa
*Attorney, Agent, or Firm*—Leydig, Voit, Osann, Mayer & Holt, Ltd.

[57] ABSTRACT

An anti-skid hydraulic braking system for a vehicle having the usual wheel cylinders, master cylinder and brake pedal, with a brake release valve interposed ahead of each wheel cylinder for selectively reducing the pressure in the wheel cylinder in accordance with a slip signal generated at the associated wheel. For the purpose of generating a slip signal, positive displacement hydraulic pumps are coupled to the respective wheels, the pumps being connected in a series loop circuit charged with control fluid so that control fluid circulates idly at low pressure in the loop as long as the wheels rotate at the same speed, but with back pressure being developed at the input connection of a pump associated with a wheel which is in a relatively slipping condition of incipient skid. Each brake release valve has an inlet port connected to the master cylinder, an outlet port connected to the wheel cylinder, and a control port which is coupled to the input connection of the associated pump for receiving a pressure signal therefrom. The valve has a first or "signal" piston movable in response to the pressure and a second piston for creating a cavity for temporary accommodation of brake fluid from the wheel cylinder. When the pressure at the control port rises, signaling an incipient skid, movement of the signal piston first cuts off the inlet port to isolate the wheel cylinder from the rest of the regular braking system and then shifts the second piston to create a cavity for accommodating slight reverse flow of fluid from the wheel cylinder, thus releasing the brake sufficiently to avoid a skid.

21 Claims, 7 Drawing Figures

CONTROL CIRCUIT FOR ANTI-SKID HYDRAULIC BRAKING SYSTEM

BACKGROUND OF THE INVENTION

The present invention relates generally to anti-skid systems for automobile vehicles. Means have been provided in the past for detecting the relative slowdown of a vehicle wheel which occurs in a skid to produce a skid signal and for utilizing such signal to relieve braking pressure at the particular wheel. Such anti-skid systems have predominantly utilized electronically generated signals. The means for generating and responding to such signals tend to be complex and costly. Such systems are characterized by hair trigger sensitivity, and general lack of reliability, and are subject to changes in braking characteristics as changes occur in the electronic components of which the system is composed.

Resort has been had to using air as the signalling medium, but air systems are equally unreliable and disadvantageous for other reasons.

Prior anti-skid systems, moreover, tend to hunt, that is, tend to act cyclically, rather than proportionately, shifting back and forth from a skidding to a non-skidding condition at a rapid rate. In short, prior systems are not capable of achieving a condition in which braking is stably maintained at a level which will produce, and hold, a slip of small but predetermined percentage for maximum, skid-free braking effect.

SUMMARY OF THE INVENTION

It is, accordingly, an object of the present invention to provide an anti-skid system for a vehicle which is reliable, which is capable of sensitively detecting a slipping condition of incipient skid, and which absolutely prevents development of a full skid at any one of the vehicle wheels. It is a more specific object of the invention to provide hydraulic means for generating a signal in proportion to the degree of slip and which is capable of modulating the braking pressure individually at the affected wheel, at the option of the designer, to permit a slight slipping condition on the order of 10% to 15% at which braking effect is found to be maximized and at which steering control is fully maintained. In short the present system permits controlled slip of any desired degree without degeneration of the slip into a skid.

It is another object to provide a braking system which, as an alternative to controlled minor slip, may be safely operated in the hunting mode. Regardless of the mode of operation, the brake fluid which flows from the wheel cylinder to temporarily relieve the braking torque is fully conserved so that there is no risk of "running out of fluid" in a prolonged stroke of the foot pedal.

It is another object of the present invention to provide an anti-skid control for an hydraulic braking system which is applicable to all vehicles employing hydraulic brakes and which, although characterized by a high degree of safety and reliability, is nevertheless simple and inexpensive to manufacture and install and which is inherently durable, capable of operating over long periods of time stably and without any maintenance problems. Indeed it is an object to provide an anti-skid system in which a mechanical adjustment to set the optimum braking condition can be easily and quickly made and, once made, remains stably in adjusted condition without requiring continual readjustment.

It is another object of the present invention to provide an anti-skid system for vehicle brakes which produces precise results but which is nevertheless made up of components which are either readily available on the commercial market or which can be easily manufactured without resort to accurate tolerances. By way of example, the system employs positive displacement hydraulic pumps, but such pumps need not be accurately machined for close clearances and high efficiently but, on the contrary, the pumps are preferably of low efficiency and low volumetric rate, thereby achieving optimum operating characteristics at lowest possible cost.

In carrying out the invention, one of the pumps is coupled to each of the vehicle wheels. Lines are provided connecting the pumps in a series loop circuit which is charged with control fluid, with the fluid circulating idly at low pressure in the loop as long as the associated wheels rotate at precisely the same speed. However, when a wheel slows down relatively to the other wheel, or wheels, to which it is connected, indicating a relatively slipping condition of incipient skid, the control fluid cannot be accepted at the pump inlet of the slipping wheel at the same rate that the fluid is being supplied by the pump at the non-slipping "upstream" wheel, resulting in back-up of control fluid and generation of back pressure which forms a slip signal.

For responding to the slip signal, a brake release valve is provided having a first piston, referred to as a "signal" piston and a second piston referred to as a brake fluid "accommodating" piston. The signal piston is biased into a normal position in which valve inlet and outlet ports are interconnected for normal operation of the brakes by the brake pedal. The signal piston upon initial movement by the control fluid, closes a valve seat to isolate the affected brake from the remainder of the regular braking system. The brake fluid accommodating piston is arranged in the path of movement of the signal piston so that continued movement of the signal piston displaces the accommodating piston, thereby creating a cavity in communication with the valve outlet port. Creation of the cavity permits brake fluid to flow reversely from the wheel cylinder thereby relieving the pressure at the wheel cylinder so that the slipping wheel is partially released by the brake reducing the slip and preventing the wheel from going into a full skid. Resumption of rotative speed reduces the signal pressure in the control fluid, tending to restore both pistons to their initial positions. The brake fluid which has been temporarily accommodated in the cavity is thus returned, without loss, to the regular braking system. Each pump is by-passed by a capillary or similar restriction to provide a control signal which varies more linearly with the rate of flow and hence with the degree of slip. The resulting lack of fluid elsewhere in the control loop is made up by flow from a reservoir through a check valve to prevent the condition of negative pressure referred to as "cavitation". Each pump is shunted by a by-pass relief valve to limit the pressure across each pump under extreme conditions. Auxiliary means are provided, and may be optionally used, to insure against loss of pressure in the rare circumstance of slippage in all of the associated wheels to equal degree.

means of an "O" ring 84. The piston 80 is pressed into the illustrated seated, or normal, position by a strong return spring 85, the spring being sufficiently stiff as to be unyielding in the face of normal hydraulic braking pressures. For guiding the piston in the bore 65 while permitting free access to the head portion 81 of the piston, the plunger is provided with a plurality of peripherally spaced lands 86. The recess 62 is vented by a vent opening 87.

In accordance with the present invention, the two pistons are slightly spaced, end to end, from one another when in their normal positions and valve surfaces are provided on the adjacent ends of the pistons so that as the signal piston begins to move, the space between the two pistons is taken up and the pistons seat together to shut off the fluid connection at the inlet opening 31 for isolation purposes. Thus the tip 73 of the signal piston is centrally hollowed as indicated at 90, with the hollow communicating, via a sliding connection, with the inlet opening 31. The hollow is flared to define an annular valve seat 91 which cooperates with a conical surface 92 on the tip of the second piston.

Under normal braking conditions, it will be apparent that there is free passage from inlet port 31 through the hollow 90 past the valve seating surfaces 91, 92 to the outlet port 32, and thence to the wheel cylinder. However, when slippage occurs in the wheel 11, causing the pump 40 to turn more slowly, the resulting back pressure in line 51 (and 55) causes the signal piston 70 to be unseated and to move upwardly to bring the valve seat 91 against the conical surface 92 on the second piston. This seals off the inlet opening, isolating the wheel cylinder 15 from its supply line 23 and the rest of the regular hydraulic braking components. Continued movement of the signal piston 70 causes the accommodating piston 80 to be displaced as illustrated in FIG. 2b, thereby opening up, adjacent the head 81 of piston 80, a cavity 100. Since a high level of pressure exists at the wheel cylinder 15, brake fluid will flow, reversely, into the outlet port 32 and into the cavity 100, thereby relieving the pressure in the wheel cylinder 15 by an amount which is in accordance with the volume of cavity which has been created, the latter depending, in turn, upon the amount of movement the signal piston 70 has undergone. Because of the small amount of brake fluid consumed by the wheel cylinder 15 in going from its relaxed state to full braking condition, and because of the incompressible nature of the brake fluid, only a small cavity volume is required to bring about a substantial decrease in wheel cylinder pressure. However, in order to enable the force of the biasing or return spring 85 to be overcome with only moderate levels of control signal pressure the signal piston 70 preferably has a diameter which greatly exceeds that of the piston 80.

It is thus seen that the condition of slippage at the wheel 11 is self-correcting: Slippage results in a slowing down of the pump 40 which results in an increase in pressure control signal applied to the control port 33 which results in movement of the signal piston 70 from its reference position. Such movement seals off the inlet by closure of seats 91, 92 and results in displacement of piston 80 and creation of cavity 100 to relieve the brake pressure which initiated the slippage. As the slippage is reduced, the signal pressure at the control port also is reduced, permitting the cavity 100 to contract slightly under the urging of the biasing spring 85, thereby causing fluid from the cavity to flow back to the wheel cylinder, with a condition of equilibrium being quickly established at a condition of slight slip in which braking is maximized and with all wheels turning for full steering control. Within the same braking cycle slip may increase and decrease a number of times due to local variations in the conditions of traction resulting in repeated cycling of fluid back and forth between the wheel cylinder and the cavity as the system strives to establish equilibrium. But regardless of the number of interchanges which may occur within a single braking action all of the braking fluid is captively retained and continues to be fully available. This is to be contrasted with anti-skid systems in which fluid is released from the wheel cylinder by controlled braking back to the fluid reservoir and in which the wheel cylinder, as a result of repeated cycling into and out of a condition of slippage, may "run out of fluid" resulting in loss of braking effect.

In accordance with one of the aspects of the present invention, each control port is provided with a restricted passage for intentional leakage of the fluid which tends to be backed up in the adjacent loop line. Thus the "excess" control fluid received by pump 40, and which cannot be accommodated by the pump due to slippage of wheel 11, is permitted to leak into the control fluid reservoir 36. Thus, the excess fluid is disposed of to keep the back pressure at a reasonable level, and a more suitable pressure signal is generated by providing a restricted passage 101 which discharges via line 102 into a region of reference pressure level, specifically into the control fluid reservoir 36. The restricted passage is preferably in the form of a capillary tube of predetermined length and diameter and with an adjustable orifice for optimization. The restriction, particularly if it is in the form of a capillary tube discharging into atmospheric pressure, results in a back pressure which is more nearly proportional to the rate of fluid flow, with the result that the pressure control signal which is applied to the control port 33 varies in accordance with the difference in rotative speed between the pump 40 and the "upstream" pump 40c. In short, the control signal pressure is more nearly proportional to the degree of the slip.

At the same time that there is excess fluid in the line 51, by reason of slowdown of the pump 40, there is a corresponding starvation in the "downstream" line 52. In order to prevent cavitation and the development of negative pressure in the line 52, each of the restrictions 101 is bypassed by a check valve 103 which is faced in a direction to supply fluid from the reservoir 36 and which is intentionally very lightly loaded so that the replenishment of fluid takes place promptly even with a low differential pressure. Thus the shortage of fluid in line 52 will be immediately made up by replenishing flow through the check valve 103a associated with the second wheel 12. To the extent that lack of fluid in the line 52 tends to produce temporary lack of fluid in the lines 53, 54 downstream therefrom, replenishment will also promptly occur through check valves 103b and 103c.

As another important feature of the present invention a bypass relief valve is connected around the pump 40 for shunting fluid directly from the upstream line 51 to the downstream line 52 when the pressure differential across the pump reaches a predetermined level. The bypass relief valve, indicated at 110, and which is of commercially available type, performs a number of significant functions. It will be understood in the first place, that the capillary 101, while providing a desired signal characteristic over the critical low range of slip, has only a limited fluid handling capacity, and indeed the capacity is intentionally limited to provide the desired range of control signal. The first function, therefore, affected by the bypass relief valve 110 is to take care of any substantial quantity of excess control fluid in line 51, fluid which cannot be accommodated by the input of the "slipping" pump 40. Not only does the relief valve serve to divert the fluid from the capillary, but it also performs the important function of limiting the pressure on the upstream side of the capillary. The capillaries, in creating a signal by reason of back pressure, have no use for high pressures. In short, the bypass relief valve serves to "protect" the release valve 30 and its associated components against the excess fluid which may be present under certain conditions of high slip and against excessive signal levels.

The relief valve 110 performs the equally important function of maintaining the downstream line 52 under pressure so that slippage at the wheel 11 will not interfere with control of downstream wheel 12. It should be noted that the replenishing function of the check valve 103a associated with the wheel 12, while capable of replenishing line 52, is ineffective to pressurize such line and positive pressure in line 52 is necessary for the anti-skid function. It will be seen, then, that the bypass relief valve 110, in effect, connects the output of pump 40c directly to the input of pump 40a so that the system associated with the latter may operate, notwithstanding correction of slippage at the intervening pump 40. It is to be particularly noted that the fact that the pump control system associated with the wheel 11 has been bypassed enhances the anti-skid control function and does not interfere with it. Similarly, if the wheel 12 should suffer a high degree of slip at the same time as wheel 11, the relief valve 110a would act to bypass the pump 40a to maintain the line 53 pressurized with control fluid, in effect, being fed from the outlet of pump 40c to the inlet of pump 40b to insure full and correct operation of the latter. In short, while the control systems associated with the respective wheels are connected in the series loop circuit, the operation of any one of them does not penalize the operation of any other.

Under normal braking conditions when there is no slippage, the wheel cylinder 15 is pressurized by fluid that flows through the brake release valve 30 from brake line 23. Adequate pressure is available in the line 53 so that passage of the fluid through the release valve 30 from inlet to outlet offers substantially no impediment. However, for the purpose of enabling more immediate return of fluid reversely through the line 23 when the brake pedal is suddenly released, the ports 31, 32 of the brake release valve are shunted by a fluid-returning check valve 115 which provides a bypass connection directly from the wheel cylinder 15 and cavity 100 back into the brake line 23. The presence of the check valve 115 insures that release of the brake line occurs promptly upon release of the foot pedal, even before the signal piston may have opened the isolating valve seats 91, 92. The check valve 115 is only lightly biased so that it also responds to slight letting up of pedal pressure, returning fluid to the line from the wheel cylinder and the cavity on a partial basis when the brake pedal is only partially released.

Figure 3:
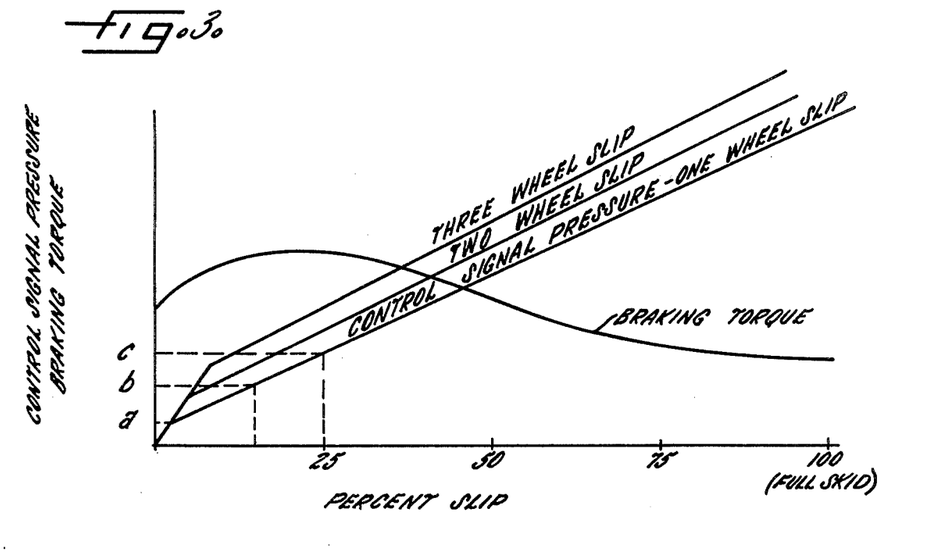

A typical characteristic curve achievable using the present system is illustrated in FIG. 3 in which the percentage of slip is plotted as the abscissa and the pressure of the control signal in line 51 (for example) as the ordinate. The pressure in the line in the absence of slip, and with control fluid circulating freely, is substantially zero. As the slip begins, accompanied by slowdown of the pump 40, back pressure builds up in the line 51 and 55, generating a pressure control signal. When the signal reaches a level $a$, corresponding to a slip of about 5%, the relief valve opens. The relief valve is preferably of the type in which the back pressure is permitted to build up progressively with the rate of flow, so that pressure continues to build up until the point $b$ is reached where the pressure is sufficient to move the signal piston 70 to engage valve surfaces 91, 92 to shut off the inlet port 31. Upon further increase in the slip, with increase in the pressure control signal to point $c$, the cavity 100 is opened sufficiently to relieve the braking torque exerted by the wheel cylinder 15, allowing the wheel to rotate more freely to reduce the slip, so that corrective action sets in before the slip has exceeded a reasonable level which may, in a practical case, be on the order of 25%. With slight relief of the braking pressure, the degree of slip will then decrease to establish equilibrium at a slightly lower slip, say between $b$ and $c$, at a slippage level which may, for example, be on the order of 15–20% until braking pressure is released by the driver. The protective action sets in quickly enough and positively enough so that there is no possibility of the slippage degenerating into a full skid.

Since the control signal pressure, particularly over the initial portion of the range, which corresponds to a slip of 0–25%, is substantially linear, the effect of the system, once slip sets in, is to modulate the pressure of the captive brake fluid within the region of maximum braking torque. Where more than one wheel slips, that is, where the wheels 12, 13 downstream from the wheel 11 also are in a slipping state, the effect is to increase the level of the control signal pressure applied to release valve 30, as shown in FIG. 3.

The return spring 85 which is associated with the accommodating piston 80 is preferably stiff enough so that the piston 80 does not yield in the face of a normal range of fluid pressure originating in the master cylinder 21. The maximum diameter of the signal piston 70 is preferably large enough so that normal range of control signal pressure, when added to the pressure of the captive fluid at the outlet port 32, will suffice to move both of the pistons together, against the forces of their return springs, a sufficient distance to create a meaningful cavity. The amount of cavity volume resulting from per unit displacement of the accommodating piston 80 may be controlled by tailoring of the maximum diameter of the piston 80. The force exerted by the return spring 85 may be controlled by screwing in, or out, the threaded plug 65, and the adjustment, once set, may be retained by using a gasket 120 of appropriate thickness under the head of the plug. Similarly, the normal position of the signal piston 70 may be determined by use of a gasket 121 under the head of the plug 64 the object being to have sufficient spacing between the valve surfaces 91, 92 to provide relatively unobstructed flow to the wheel cylinder for normal braking while, nevertheless, spacing the valve seat surfaces 91, 92 sufficiently closely so that, once slipping starts, the wheel cylinder of the affected wheel is promptly isolated from the rest of the regular braking system which remains under the control of the foot pedal 20.

Using the present anti-skid system, the maximum possible degree of slip is at a sufficiently low level, on the order of 25%, so as to insure effective steering at the front wheels of the vehicle as well as insuring a high degree of braking effect with equilibrium being preferably established in the range of 10-20%.

The same type of action, as just described, occurs even though more than one wheel tends to slip. Since there will be local differences in the braking surfaces, condition of the tires, and the like, slippage will not normally occur at each wheel at the same instant. However, it is conceivable that all four wheels might be locked by the foot pedal and go into a full skid simultaneously, accompanied by stoppage of all of the pumps, so that there would be no pressure anywhere in the loop to initiate the anti-skid function. Accordingly, it is part of the present invention to provide means for injecting auxiliary pressurized control fluid into the loop under conditions in which the brakes might become simultaneously locked, that is, under conditions of radical deceleration. Thus, in carrying out the invention, I provide an auxiliary hydraulic pump 130 preferably of the positive displacement type having an input connection 131 to the fluid reservoir 36 and an output connection 132 to the loop, specifically to the loop line 54. The pump is connected by the shaft 133 to a motor 134 having a source of current 135, normally the vehicle battery, in series with a deceleration switch 136. The switch may be any suitable switch capable of making contact in response to deceleration and in the simplest form may include a blade biased to open position carrying a weight 137. A pressure responsive switch 140 is also interposed in the circuit connected to brake line 26 by a line 141 so that the auxiliary pump is only energized when the vehicle is being braked under conditions of high deceleration.

Thus, whenever the vehicle decelerates at a rate exceeding a set amount, switches 136, 140 close starting the motor 134 to drive the pump to insure that fluid exists in the loop at sufficient pressure to initiate the anti-skid function. Since the auxiliary pump is connected to the line 54, if the wheel 14 tends to become locked, along with all the other wheels, sufficient pressure will exist at the control port 33c of the brake release valve 30c to form a cavity to drop the pressure of the wheel cylinder 18 so that the wheel 14 begins to rotate. Rotation of the wheel 14 will develop sufficient pressure in line 51 to operate brake release valve 30 to free up wheel 11 which will, in turn, pressurize line 52 so that rapidly, in domino fashion, all of the wheels of the vehicle will be rotatable but with full braking effect. A first check valve 142 is preferably interposed at the outlet of pump 130 to prevent the pump from being driven as a motor under idle conditions, while a second check valve 143 prevents reverse flow of fluid in the line 54. It is important that the capacity of the auxiliary pump be limited to a low flow rate, for example, a flow rate corresponding to a vehicle speed of about ten miles per hour. If it is desired to sense directly lack of fluid flow in line 54, a "zero flow" detector switch 144, of the type making contact at zero or low rates of flow, may be additionally interposed in the motor control circuit. While injection of auxiliary fluid at one point of the loop is sufficient, the outlet connection 132 of the auxiliary pump may, if desired, be connected to all four of the lines 51-54 via similar check valves.

Figure 2:
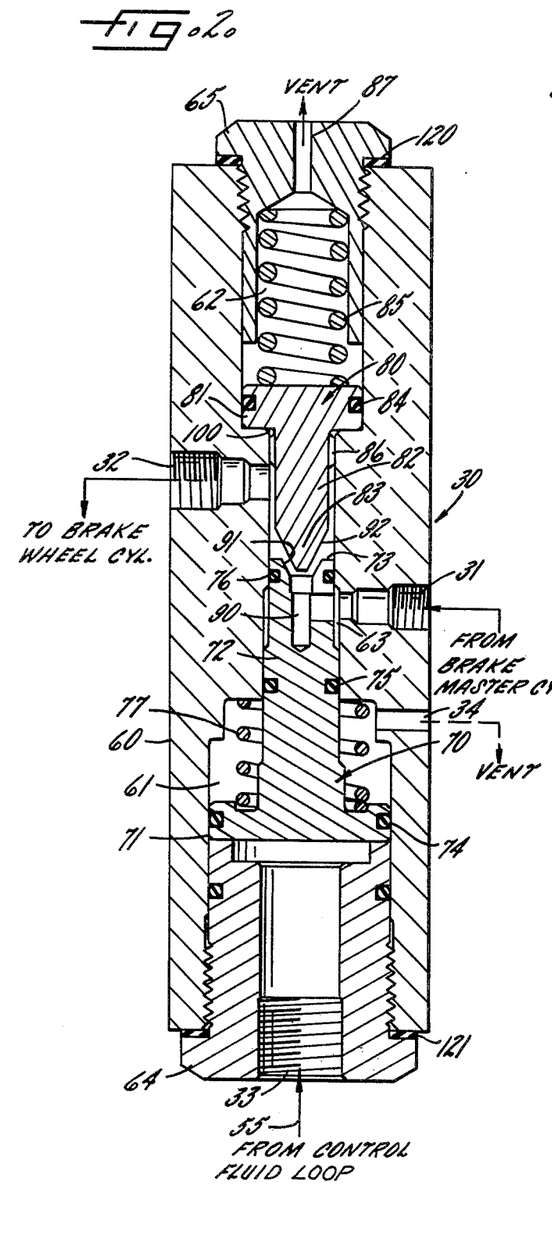
Figure 2A:
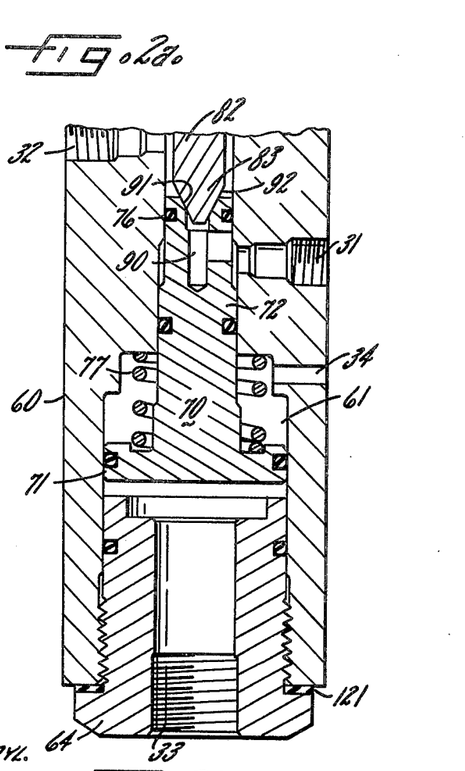
Figure 2B:
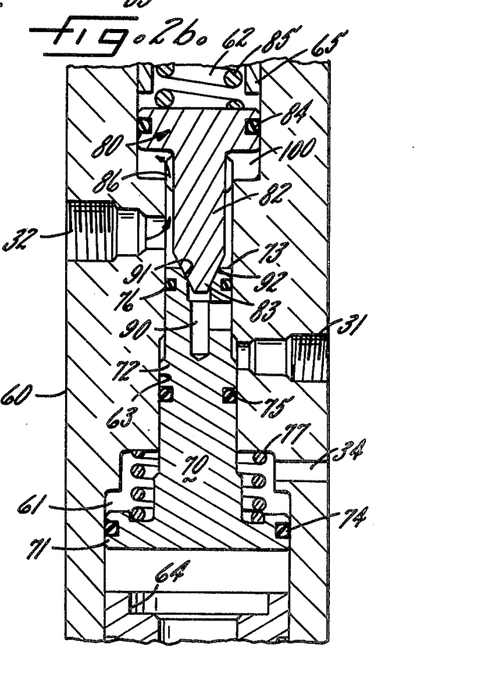
Figure 4:
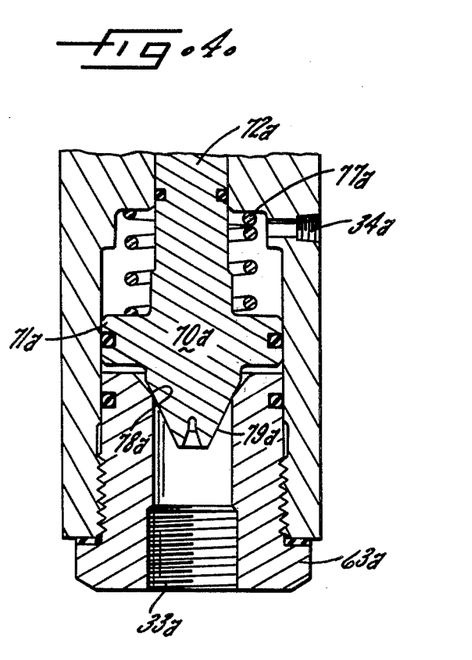

In the construction of brake release valve described in FIG. 2, movement of the signal piston 70 occurs gradually and progressively after the signal pressure reaches a threshold sufficient to oppose the initial force of the return spring 77. The response can be made more rapid and positive, with snap action after achieving a threshold condition, by employing a differential poppet in lieu of the signal piston as illustrated in FIG. 4. Here the poppet, indicated at 70a, has a large diameter portion 71a and a relatively small diameter valve seat 78a cooperating with a conical tip 79a. Thus movement of the poppet does not take place until sufficient control pressure exists, which, when applied to the effective area enclosed by the seat 78a, is capable of overcoming the initial force of the return spring 77a. As soon as the valve surfaces 78a, 79a crack open, control fluid is admitted to the entire frontal area of the signal piston 70a resulting in an abrupt increase in pressure applied to the signal piston causing the piston to snap upwardly, closing valve surfaces 91, 92 and immediately shifting the accommodating piston 80 upwardly to form a cavity. It will be apparent that the snap action effect may be varied by utilizing different plugs 63 a having different diameters of valve seat 78a. When a poppet type piston is used the space in back of the piston 70, and which is occupied by the biasing spring 77 is preferably kept filled with control fluid via a line 35 connected to vent 34 and leading to the reservoir 36.

While the invention has been described (FIG. 3) in terms of modulation of brake pressure by varying the volume of cavity 100 in accordance with the pressure of the control signal to establish a temporary equilibrium condition of slight slippage, it is one of the features of the invention that a system is capable of operating safely in a hunting mode without depletion of brake fluid in the wheel cylinder. That is to say, the accommodating piston 80 may, in response to a sustained braking cycle at the foot pedal, reciprocate back and forth a number of times between a slip and no-slip condition while conserving the trapped brake fluid and with the same brake fluid undergoing numerous slight reversals of flow in the line leading from the outlet port 32 to the brake cylinder 15. This conservation of brake fluid is to be contrasted with systems in which excessive pressure at the wheel cylinder is relieved by permitting slight leakage to the brake fluid reservoir. Nevertheless, one skilled in the art will recognize that certain features of the present invention are fully utilizable in alternate systems which do not employ an enclosed variable cavity 100 for accommodation of fluid and in which controlled leakage to the reservoir is, for the sake of simplicity, permitted.

Moreover, while I prefer to employ slidable, spring biased pistons 70, 80, it will be understood by one skilled in the art that, if desired, the spring biased diaphragms may be substituted therefor without departing from the invention and the term "piston" should be interpreted accordingly.

The term "master cylinder" as used herein is also intended to be a general term to cover any actuator capable of exerting pressure in the normal hydraulic brake lines 23-26, and the term "pedal" shall be understood to mean any control device for controlling such an actuator.

It is one of the features of the present system that two completely isolated bodies of fluid are employed for braking and control respectively. While both fluids enter the brake release valve 30 (FIG. 2), there is no possibility of mixing even in the event of a faulty "O"

ring or seal. Thus, referring to FIG. 2, control fluid exists at the lower side of the piston 70. Even if such fluid, which is under pressure, should leak past "O" ring 74, it will drain harmlessly through the vent. Similarly, if any of the brake fluid, also under pressure, should leak past the "O" ring 75, it, too, will drain harmlessly without tending to mix with the control fluid. In short, we do not have a situation in which two separate liquids are on opposite sides of the same "O" ring. While it is true that in the embodiment of FIG. 4 different fluids exist on the opposite sides of an "O" ring, leakage of control fluid is precluded by positive seating at the poppet valve surfaces under normal conditions so that leakage, in any event, tends to be minimized.

Figure 1:
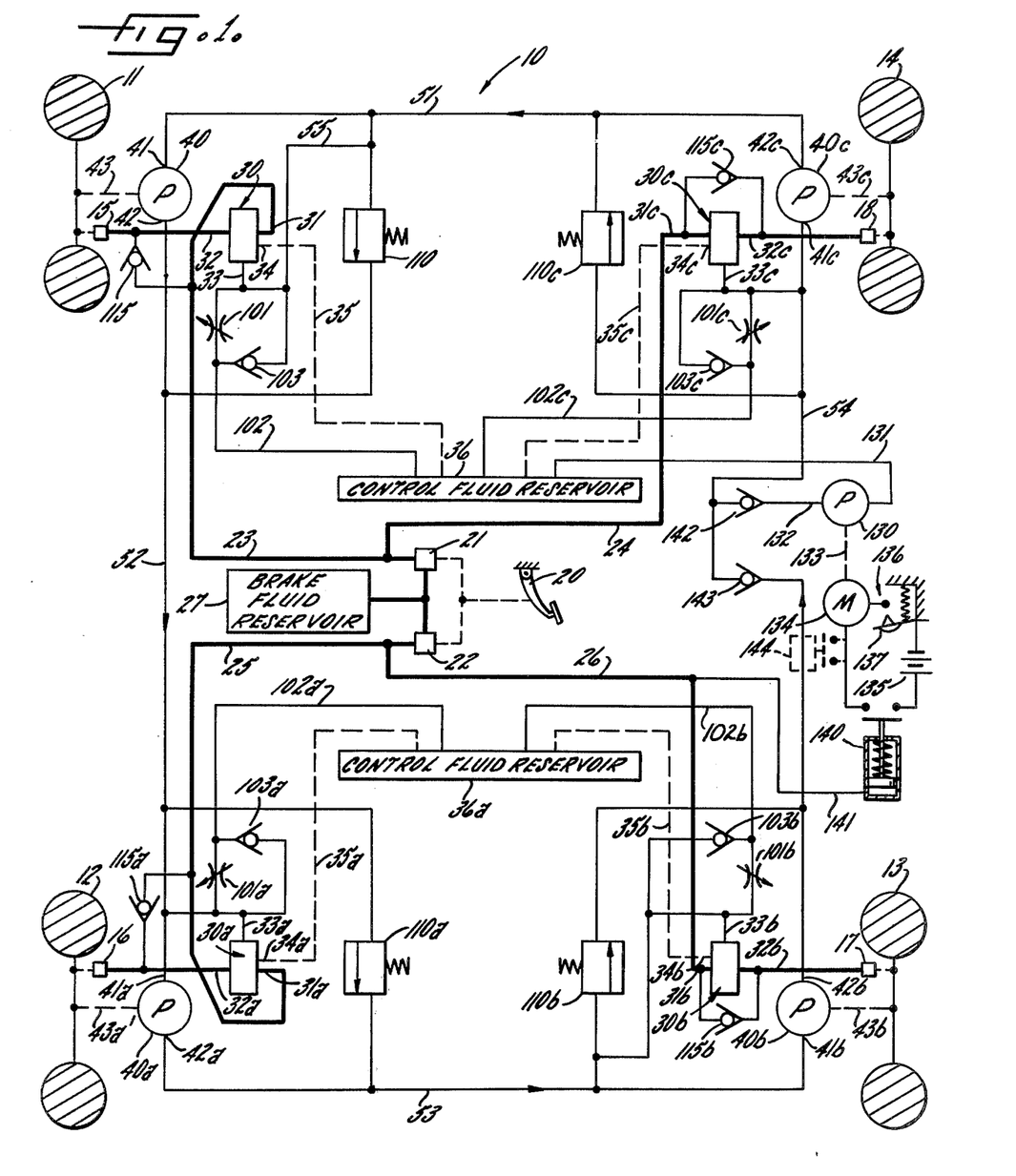
Figure 5:
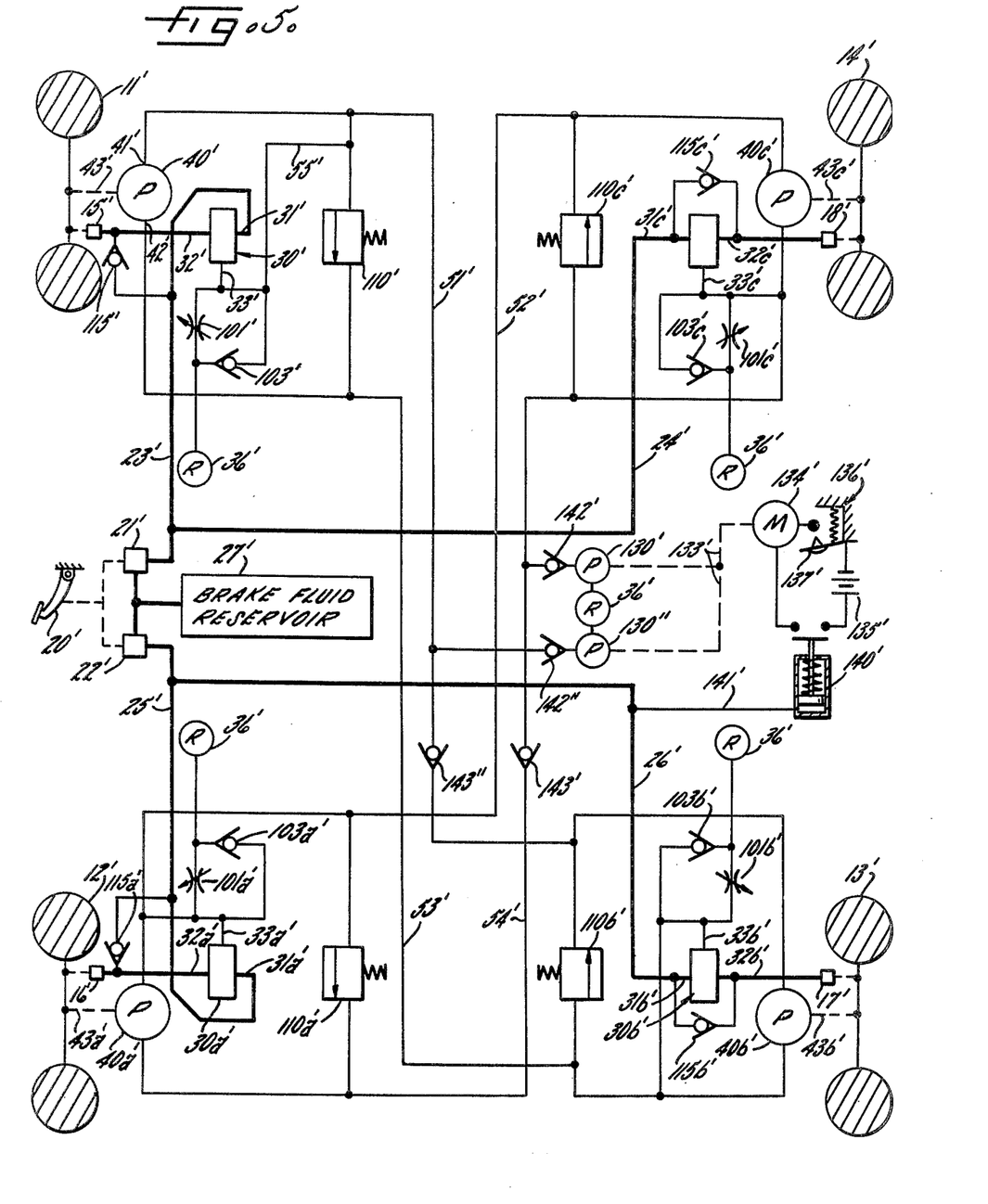

While the invention has been described in connection with a system (FIG. 1) in which pumps at all of the wheels are connected in the same loop circuit 51–54, it will be understood that the invention is not limited thereto and, if desired, the pumps at the diagonal positions may be looped together as shown in FIG. 5. Referring to that figure, elements which are similar to the elements in FIG. 1 have been designated by the same reference numerals, with the addition of a prime. Thus the pump 40' associated with wheel 11' is connected, via lines 51', 53' in a loop circuit with pump 40b' associated with wheel 13'. Similarly the pump 40a' at wheel 12' is connected, via lines 52', 54', in a loop circuit with pump 40c'. It is to be noted that auxiliary means are provided for furnishing pressurized fluid to each of the loop circuits independently to take care of the condition of simultaneous skidding of the looped wheels. Thus, instead of providing a single pump 130, as was done in FIG. 1, two separate pumps 130', 130", both coupled to a drive motor 134', are provided for feeding the loop circuits via check valves 142', 143", respectively. Each wheel in a loop acts as a reference for the companion wheel. The diagonal connection tends to insure against the possibility of simultaneous slippage. In spite of the fact that a single loop circuit has been replaced, in FIG. 5, by two separate loop circuits, the operation, features and advantages are substantially the same and need not be repeated. It will be understood that the term "pumps being connected in a series loop circuit" refers to either the arrangement disclosed in FIG. 1 in which all of the wheels are connected in a loop or the system of FIG. 5 where the loop circuitry includes less than the total number of wheels.

It is one of the features of the present invention that the control characteristics may be varied over rather wide limits at the choice of the designer. Thus it will be understood that the particular characteristic of control signal pressure which is set forth in FIG. 3 results where the relief valves are set to perform a relief function at relatively low pressure and where such relief valves have a rising pressure characteristic thereafter upon increased flow. The invention also contemplates setting the relief valves at a higher pressure so that they perform a primarily protecting function which will, of course, change the shape of the characteristic without, however, sacrificing the benefits of the invention.

It is one of the features of the invention, as disclosed and claimed, that braking pressure at a slipping wheel is released thereby to prevent the wheel from going into a full skid. It will be understood that this applies to normal driving speeds where sufficient fluid is discharged from the upstream wheel pump to develop the signal level necessary to preclude skidding. It will be understood, however, that since the wheel pumps produce fluid at a low rate, and are intentionally somewhat inefficient, the present system does not necessarily provide skid protection at extremely low speeds, for example, speeds of five to ten miles per hour or less, but this does not detract from the utility of the invention since a vehicle travelling at such a low speed has relatively low kinetic energy so that it is brought to a halt promptly, after skidding only a few feet if, indeed, a full skidding condition should develop.

The present anti-skid system has been found to have a number of important features and advantages fully supporting the objects set forth above. The system, being extremely simple and hydraulically operated is both reliable and inexpensive, having numerous advantages over the more complex electronic schemes now in current usage. Hydraulic components, being well lubricated, and sealed to exclude foreign matter, are long wearing, are not subject to catastrophic failure, and do not change in characteristics as a result of aging as do the components in analogous electronic circuitry. Thus, once the present system is installed and initially adjusted, it may be expected to retain the adjusted characteristics indefinitely to provide continuing safety over the life of the vehicle. While the system is particularly well suited for use in large off-highway vehicles in which the wheels are driven by individual electric driving motors, providing convenient driving connection to the respective wheel pumps, its use is not limited thereto and the system is applicable to vehicles of all types.

What is claimed is:

1. In an hydraulic braking system for a vehicle having wheel brakes employing respective wheel cylinders, means including a master cylinder and brake pedal for applying brake fluid to the wheel cylinders in proportion to the pressure exerted on the pedal for braking the vehicle to a stop, a positive displacement hydraulic pump coupled to each wheel, each pump having an input connection and an output connection, the pumps being connected in a series loop circuit charged with control fluid so that control fluid circulates idly at low pressure in the loop as long as the wheels rotate at the same speed but with back pressure being developed at the input connection of a pump associated with a wheel which is in a relatively slipping condition of incipient skid by reason of the excess control fluid fed thereto, brake release valve means responsive to the back pressure of control fluid for correspondingly relieving the pressure of the brake fluid applied to the associated wheel cylinder thereby to prevent the wheel from going into a full skidding condition, an auxiliary source of pressurized control fluid, first means responsive to deceleration of the vehicle, second means responsive to lack of flow of control fluid in the loop, means for normally isolating the auxiliary source from the loop circuit, and means operated upon joint response of the first and second means for connecting the auxiliary source to the loop circuit.

2. In an hydraulic braking system for a vehicle having wheel brakes employing respective wheel cylinders, means including a master cylinder and brake pedal for applying brake fluid to the wheel cylinders in proportion to the pressure exerted on the pedal for braking the vehicle to a stop, a positive displacement hydraulic pump coupled to each wheel, each pump having an input connection and an output connection, the pumps being connected in a series loop circuit charged with control fluid so that control fluid circulates idly at low pressure in the loop as long as the wheels rotate at the same speed but with back pressure being developed at the input connection of a pump associated with a wheel which is in a relatively slipping condition of incipient skid by reason of the excess control fluid fed thereto, and brake release valve means responsive to the back pressure of control fluid for sequentially (a) isolating the associated wheel cylinder from the master cylinder and (b) temporarily relieving the pressure of the brake fluid applied to the wheel cylinder of the slipping wheel thereby to prevent the wheel from going into a full skidding condition, each pump being shunted by a pressure relief valve for limiting the maximum back pressure to a predetermined level and for bypassing fluid around the pump thereby to furnish fluid to the input connections of the pumps downstream from the slipping wheel.

3. The combination as claimed in claim 2 in which the bodies of brake fluid and control fluid both exist in the brake release valve means and in which a chamber vented to the atmosphere exists between the bodies to prevent leakage from one body to the other.

4. The combination as claimed in claim 2 in which the pumps at the wheels are connected in pairs in respective loop circuits, the paired pumps occupying diagonal positions on the vehicle.

5. In an hydraulic braking system for a vehicle having wheel brakes employing respective wheel cylinders, means including a master cylinder and brake pedal for applying brake fluid to the wheel cylinders in proportion to the pressure exerted on the pedal for braking the vehicle to a stop, a positive displacement hydraulic pump coupled to each wheel, each pump having an input connection and an output connection, the pumps being connected in a series loop circuit charged with control fluid so that control fluid circulates idly at low pressure in the loop as long as the wheels rotate at the same speed but with back pressure being developed at the input connection of a pump associated with a wheel which is in a relatively slipping condition of incipient skid by reason of the excess control fluid fed thereto, and brake release valve means responsive to the back pressure of control fluid for sequentially (a) isolating the associated wheel cylinder from the master cylinder and (b) temporarily relieving the pressure of the brake fluid applied to the wheel cylinder of the slipping wheel thereby to prevent the wheel from going into a full skidding condition, auxiliary means being provided for injecting pressurized fluid into the loop when the wheels in the loop are simultaneously in full skidding condition.

6. In an hydraulic braking system for a vehicle having wheel brakes employing respective wheel cylinders, means including a master cylinder and brake pedal for applying brake fluid to the wheel cylinders in proportion to the pressure exerted on the pedal for braking the vehicle to a stop, a positive displacement hydraulic pump coupled to each wheel, each pump having an input connection and an output connection, the pumps being connected in a series loop circuit charged with control fluid so that control fluid circulates idly at low pressure in the loop as long as the wheels rotate at the same speed but with back pressure being developed at the input connection of a pump associated with a wheel which is in a relatively slipping condition of incipient skid by reason of the excess control fluid fed thereto, and brake release valve means responsive to the back pressure of control fluid for sequentially (a) isolating the associated wheel cylinder from the master cylinder and (b) temporarily relieving the pressure of the brake fluid applied to the wheel cylinder of the slipping wheel thereby to prevent the wheel from going into a full skidding condition, an auxiliary hydraulic pump being connected to the loop for pressurizing the same, a motor for driving the pump, and means for energizing the motor to inject auxiliary fluid into the loop at a low rate upon absence of fluid flow therein accompanying a full skid by all of the wheels in the loop.

7. In an hydraulic braking system for a vehicle having wheel brakes employing respective wheel cylinders, means including respective brake lines and a pedal-controlled source of pressurized brake fluid for applying fluid to the wheel cylinders in proportion to the pressure exerted on the pedal for braking the vehicle to a stop, a positive displacement hydraulic pump coupled to each wheel, each pump having an input connection and an output connection, the pumps being connected in a series loop circuit charged with control fluid so that control fluid circulates idly at low pressure in the loop as long as the wheels rotate at the same speed but with back pressure being developed at the input connection of a pump associated with a wheel which is in a relatively slipping condition of incipient skid by reason of the excess control fluid fed thereto, brake release valve means responsive to the back pressure of control fluid for sequentially (a) isolating the associated wheel cylinder from the master cylinder and (b) correspondingly relieving the pressure of the brake fluid applied to the wheel cylinder thereby to prevent the wheel from going into a full skidding condition, and check valves respectively connected from the wheel cylinders to the source for insuring immediate release of pressure at the wheel cylinders and return of fluid to the associated brake lines upon release of pressure at the source notwithstanding the isolating effect of the brake release valve means.

8. In an hydraulic braking system for a vehicle having wheel brakes employing respective wheel cylinders, means including a master cylinder and brake pedal for applying brake fluid to the wheel cylinders in proportion to the pressure exerted on the pedal for braking the vehicle to a stop, a positive displacement hydraulic pump coupled to each wheel, each pump having an input connection and an output connection, the pumps being connected in a series loop circuit charged with control fluid so that control fluid circulates idly at low pressure in the loop as long as the wheels rotate at the same speed but with back pressure being developed at the input connection of a pump associated with a wheel which is in a relatively slipping condition of incipient skid by reason of excess control fluid fed thereto, the back pressure varying in accordance with the degree of slip, means for creating a fluid-receiving cavity in communication with each wheel cylinder, and brake release valve means including a first piston responsive to back pressure for isolating the associated wheel cylinder and its cavity from the master cylinder and a second piston for creating a a cavity in communication with the associated wheel cylinder, the second piston being directly engaged by the first piston so that upon continued movement of the first piston the cavity is progressively enlarged in accordance with the degree of slip so as to progressively relieve the pressure of the brake fluid applied to the wheel cylinder thereby to prevent the wheel from going into a full skidding condition.

9. In an hydraulic braking system for a vehicle having wheel brakes employing respective wheel cylinders, means including a master cylinder and brake pedal for applying brake fluid to the wheel cylinders in proportion to the pressure exerted on the pedal for braking the vehicle to a stop, a positive displacement hydraulic pump coupled to each wheel, each pump having an input connection and an output connection, the pumps being connected in a series loop circuit charged with control fluid so that control fluid circulates idly at low pressure in the loop as long as the wheels rotate at the same speed but with back pressure being developed at the input connection of a pump associated with a wheel which is in a relatively slipping condition of incipient skid by reason of excess control fluid fed thereto, a control fluid reservoir, and brake release valve means responsive to such back pressure for correspondingly relieving the pressure of the brake fluid applied to the associated wheel cylinder thereby to prevent the wheel from going into a full skidding condition, the input connection of each pump having a restricted passage leading to the reservoir for providing a leakage path for the excess control fluid thereby to produce a back pressure which varies in accordance with the rate of flow of the excess fluid, and means for adjusting the size of the passage to vary the degree of back pressure.

10. The combination as claimed in claim 9 in which the restricted passage is in the form of a capillary.

11. In an hydraulic braking system for a vehicle having wheel brakes employing respective wheel cylinders, means including a master cylinder and brake pedal for applying brake fluid to the wheel cylinders in proportion to the pressure exerted on the pedal for braking the vehicle to a stop, a positive displacement hydraulic pump coupled to each wheel, each pump having an input connection and an output connection, the pumps being connected in a series loop circuit charged with control fluid so that control fluid circulates idly at low pressure in the loop as long as the wheels rotate at the same speed but with back pressure being developed at the input connection of a pump associated with a wheel which is in a relatively slipping condition of incipient skid by reason of the excess control fluid fed thereto, brake release valve means responsive to such back pressure for correspondingly relieving the pressure of the brake fluid applied to the associated wheel cylinder thereby to prevent the wheel from going into a full skidding condition, a reservoir for the control fluid, the input connection of each pump having a restricted passage leading to the reservoir providing a leakage path for the excess control fluid and thereby to produce back pressure in accordance with the rate of flow of such fluid, the input connection of each pump being connected to the reservoir by a check valve faced to feed control fluid from the reservoir thereby to preclude cavitation at the input connection by reason of a slowing condition in the pump immediately upstream therefrom.

12. In an hydraulic braking system for a vehicle having wheel brakes employing respective wheel cylinders, means including a master cylinder and brake pedal for applying brake fluid to the wheel cylinders in proportion to the pressure applied to the pedal for braking the vehicle to a stop, a positive displacement hydraulic pump coupled to each wheel, each pump having an input connection and an output connection, the pumps being connected in a series loop circuit and charged with control fluid so that control fluid circulates idly at low pressure in the loop as long as the wheels rotate at the same speed but with back pressure being developed at the input connection of a pump associated with a wheel which in a relatively slipping condition of incipient skid by reason of the excess control fluid fed thereto, the input connection of each pump having restricted passage providing a leakage path for the excess control fluid so that the back pressure varies in accordance with the rate of flow of the excess fluid, the brake release valve means responsive to such variable back pressure for correspondingly relieving the pressure of the brake fluid applied to the associated wheel cylinder thereby to prevent the wheel from going into a full skidding condition, each pump being shunted by a pressure relief valve for limiting the maximum back pressure to a predetermined level and for bypassing fluid around the pump thereby to furnish fluid to the input connections of the pumps downstream from the slipping wheel.

13. In an hydraulic braking system for a vehicle having wheel brakes employing respective wheel cylinders, means including a master cylinder and brake pedal for applying brake fluid to the wheel cylinders in proportion to the pressure exerted on the pedal for braking the vehicle to a stop, a positive displacement hydraulic pump coupled to each wheel, each pump having an input connection and an output connection, the pumps being connected by lines in a series loop circuit charged with control fluid so that control fluid circulates idly at low pressure in the loop as long as the wheels rotate at the same speed but with back pressure being developed at the input connection of a pump associated with a wheel which is in a relatively slipping condition of incipient skid by reason of the excess control fluid fed thereto, and brake release valve means responsive to the back pressure of the control fluid for correspondingly relieving the pressure of the brake fluid applied to the associated wheel cylinder thereby to prevent the wheel from going into a full skidding condition, a control fluid reservoir, each line having a restricted passage leading to the reservoir providing a leakage path for backed-up control fluid, each line being connected to the line downstream thereof by a relief valve for limiting the maximum pressure drop which can exist across each of the pumps, each line being connected to the reservoir by a check valve faced to feed control fluid from the reservoir thereby to preclude cavitation in the line.

14. In an hydraulic braking system for a vehicle having wheel brakes employing respective wheel cylinders, means including a master cylinder and brake pedal for applying brake fluid to the wheel cylinders in proportion to the pressure exerted on the pedal for braking the vehicle to a stop, a positive displacement hydraulic pump coupled to each wheel, each pump having an input connection and an output connection, the pumps being connected to a series loop circuit charged with control fluid so that control fluid circulates idly at low pressure in the loop as long as the wheels rotate at the same speed but with signal pressure being developed in the form of back pressure at the input connection of a pump associated with the wheel which is in a relatively slipping condition of incipient skid by reason of excess control fluid fed thereto, a brake release valve associated with each wheel cylinder having (a) an inlet port connected to the master cylinder, (b) an outlet port connected to the wheel cylinder, (c) a control port connected to the input connection of the associated pump, (d) excess brake fluid accommodating means, and (e) a signal piston movable in response to the signal pressure at the control port, the signal piston having a normal low pressure position in which the inlet port is connected to the outlet port for normal operation of the brakes by the pedal, the signal piston having a valve seat which is closed upon initial movement of the piston in response to pressure at the control port for closing off the inlet port to isolate the associated wheel cylinder from the master cylinder, the signal piston being controllingly coupled to the excess brake fluid accommodating means so that upon build-up of pressure at the control port brake fluid is permitted to flow reversely from the wheel cylinder to the accommodating means to relieve the pressure in the wheel cylinder thereby to prevent the wheel from going into a full skidding condition, each pump being shunted by a pressure relief valve for limiting the maximum back pressure to a predetermined level and for bypassing fluid around the pump thereby to furnish fluid to the input connections of the pumps downstream from the slipping wheel.

15. In an hydraulic braking system for a vehicle having wheel brakes employing respective wheel cylinders, means including a master cylinder and a brake pedal for applying brake fluid to the wheel cylinders in proportion to the pressure exerted on the pedal for braking the vehicle to a stop, a positive displacement hydraulic pump coupled to each wheel, each pump having an input connection and an output connection, the pumps being connected in a series loop circuit charged with control fluid so that control fluid circulates idly at low pressure in the loop as long as the wheels rotate at the same speed but with signal pressure being developed in the form of back pressure at the input connection of a pump associated with a wheel which is in a relatively slipping condition of incipient skid by reason of excess control fluid fed thereto, a brake release valve associated with each wheel cylinder (a) an inlet port connected to the master cylinder, (b) an outlet port connected to the wheel cylinder, and (c) a control port connected to the input connection of the associated pump, the brake release valve having a signal piston biased into a normal position and progressively movable therefrom upon increase in signal pressure at the control port, the inlet port being connected to the outlet port when the signal piston is in normal position, the signal piston having a valve seat which is closed upon initial movement of such piston occurring in response to pressure at the control port for closing off the inlet port thereby to isolate the associated brake from the master cylinder, the brake release valve having a brake fluid accommodating piston biased into a normal position and displaceable therefrom to create a cavity which is coupled to the outlet port, the brake fluid accommodating piston being connected to the signal piston so that upon increasing signal pressure at the control port the cavity is progressively enlarged permitting flow of brake fluid reversely from the wheel cylinder into the cavity to relieve the pressure in the wheel cylinder thereby to prevent the wheel from going into a full skidding condition, each pump being shunted by a pressure relief valve for limiting the maximum back pressure to a predetermined level and for bypassing fluid around the pump thereby to furnish fluid to the input connections of the pumps downstream from the slipping wheel.

16. In an hydraulic braking system for a vehicle having wheel brakes employing respective wheel cylinders, means including a master cylinder and a brake pedal for applying brake fluid to the wheel cylinders in proportion to the pressure exerted on the pedal for braking the vehicle to a stop, a positive displacement hydraulic pump coupled to each wheel, each pump having an input connection and an output connection, the pumps being connected in a series loop circuit charged with control fluid so that control fluid circulates idly at low pressure in the loop as long as the wheels rotate at the same speed but with signal pressure being developed in the form of back pressure at the input connection of a pump associated with a wheel which is in a relatively slipping condition of incipient skid by reason of excess control fluid fed thereto, a brake release valve associated with each wheel cylinder having (a) an inlet port connected to the master cylinder, (b) an outlet port connected to the wheel cylinder, and (c) a control port connected to the input connection of the associated pump, the brake release valve having a signal piston biased into a normal position and progressively movable therefrom upon increase in signal pressure at the control port, the inlet port being connected to the outlet port when the signal piston is in normal position, the signal piston having a valve seat which is closed upon initial movement of such piston occurring in response to pressure at the control port for closing off the inlet port thereby to isolate the associated brake from the master cylinder, the brake release valve having a brake fluid accommodating piston biased into a normal position and displaceable therefrom to create a cavity which is coupled to the outlet port, the brake fluid accommodating piston being in physical engagement with the signal piston so that upon increasing signal pressure at the control port the cavity is progressively enlarged permitting flow of brake fluid reversely from the wheel cylinder into the cavity to relieve the pressure in the wheel cylinder thereby to prevent the wheel from going into a full skidding condition, a control fluid reservoir, means including a restricted passage for connecting each control port to the reservoir, each pump being shunted by a pressure relief valve for limiting the maximum back pressure to a predetermined level and for bypassing fluid around the pump thereby to furnish fluid to the input connections of the pumps downstream from the slipping wheel.

17. In an hydrualic braking system for a vehicle having wheel brakes employing respective wheel cylinders, means including a master cylinder and a brake pedal for applying brake fluid to the wheel cylinders in proportion to the pressure exerted on the pedal for braking the vehicle to a stop, a positive displacement hydraulic pump coupled to each wheel, each pump having an input connection and an output connection, the pumps being connected in a series loop circuit charged with control fluid so that control fluid circulates idly at low pressure in the loop as long as the wheels rotate at the same speed but with signal pressure being developed in the form of back pressure at the input connection of a pump associated with a wheel which is in a relatively slipping condition of incipient skid by reason of excess control fluid fed thereto, a brake release valve associated with each wheel cylinder having (a) an inlet port connected to the master cylinder, (b) an outlet port connected to the wheel cylinder, and (c) a control port connected to the input connection of the associated pump, the brake release valve having a signal piston biased into a normal position and progressively movable therefrom upon increase in signal pressure at the control port, the inlet port being connected to the outlet port when the signal piston is in normal position, the signal piston having a valve seat which is closed upon initial movement of such piston occurring in response to pressure at the control port for closing off the inlet port thereby to isolate the associated brake from the master cylinder, the brake release valve having a brake fluid accommodating piston biased into a normal position and displaccable therefrom to create a cavity which is coupled to the outlet port, the brake fluid accommodating piston being connected to the signal piston so that upon increasing signal pressure at the control port the cavity is progressively enlarged permitting flow of brake fluid reversely from the wheel cylinder into the cavity to relieve the pressure in the wheel cylinder thereby to prevent the wheel from going into a full skidding condition, a control fluid reservoir, and means including a restricted passage for connecting each control port to the reservoir, each restricted passage being shunted by a check valve for feeding of fluid from the reservoir for avoidance of cavitation in the associated portion of the loop circuit.

18. In an hydraulic braking system for a vehicle having wheel brakes employing respective wheel cylinders, means including a master cylinder and a brake pedal for applying brake fluid to the wheel cylinders in proportion to the pressure exerted on the pedal for braking the vehicle to a stop, a positive displacement hydraulic pump coupled to each wheel, each pump having an input connection and an output connection, the pumps being connected in a series loop circuit charged with control fluid so that control fluid circulates idly at low pressure in the loop as long as the wheels rotate at the same speed but with signal pressure being developed in the form of back pressure at the input connection of a pump associated with a wheel which is in a relatively slipping condition of incipient skid by reason of excess control fluid fed thereto, a brake release valve associated with each wheel cylinder having (a) an inlet port connected to the master cylinder, (b) an outlet port connected to the wheel cylinder, and (c) a control port connected to the input connection of the associated pump, the brake release valve having a signal piston biased into a normal position and progressively movable therefrom upon increase in signal pressure at the control port, the inlet port being connected to the outlet port when the signal piston is in normal position, the signal piston having a valve seat which is closed upon initial movement of such piston occurring in response to pressure at the control port for closing off the inlet port thereby to isolate the associated brake from the master cylinder, the brake release valve having a brake fluid accommodating piston biased into a normal position and displaceable therefrom to create a cavity which is coupled to the outlet port, the brake fluid accommodating piston being connected to the signal piston so that upon increasing signal pressure at the control port the cavity is progressively enlarged permitting flow of brake fluid reversely from the wheel cylinder into the cavity to relieve the pressure in the wheel cylinder thereby to prevent the wheel from going into a full skidding condition, a control fluid reservoir, and means including a restricted passage for connecting each control port to the reservoir, auxiliary means being provided for injecting pressurized fluid into the loop when the vehicle is undergoing predetermined deceleration.

19. In an hydraulic braking system for a vehicle having wheel brakes employing respective wheel cylinders, means including a master cylinder and brake pedal for applying brake fluid to the wheel cylinders in proportion to the pressure exerted on the pedal for braking the vehicle to a stop, a positive displacement hydraulic pump coupled to each wheel, each pump having an input connection and an output connection, the pumps being connected in a series loop circuit charged with control fluid so that the control fluid circulates idly at low pressure in the loop as long as the wheels rotate at the same speed but with signal pressure being developed in the form of back pressure at the input connection of a pump associated with a wheel which is in a relatively slipping condition of incipient skid by reason of excess control fluid fed thereto, a brake release valve associated with each wheel cylinder having (a) an inlet port connected to the master cylinder, (b) an outlet port connected to the wheel cylinder, and (c) a control port connected to the input connection of the associated pump, the release valve having a signal piston having a spring for biasing the same into a normal position and progressively movable therefrom in response to signal pressure at the control port, the inlet port being connected to the outlet port when the signal piston is in normal position for normal operation of the brakes by the pedal, and the signal piston having a valve seat which is closed upon initial movement of the piston occurring in response to pressure at the control port for closing off the inlet port to isolate the associated brake from the master cylinder, the release valve having a brake fluid accommodating piston having a spring for biasing the same into a normal position and displaceable therefrom to create a cavity communicating with the outlet port, the brake fluid accommodating piston being located in the path of movement of the signal piston so that upon continued movement of the latter the cavity is progressively enlarged permitting reverse flow of brake fluid from the wheel cylinder into the cavity thereby to relieve the pressure in the wheel cylinder preventing the wheel from going into a full skidding condition, the biasing spring being adjustable for adjusting the degree of brake release for a given amount of signal pressure thereby permitting individual adjustment of the brake release characteristic at each wheel.

20. In an hydraulic braking system for a vehicle having wheel brakes employing respective wheel cylinders, means including a master cylinder and brake pedal for applying brake fluid to the wheel cylinders in proportion to the pressure exerted on the pedal for braking the vehicle to a stop, a positive displacement hydraulic pump coupled to each wheel, each pump having an input connection and an output connection, the pumps being connected in a series loop circuit charged with control fluid so that the control fluid circulates idly at low pressure in the loop as long as the wheels rotate at the same speed but with the signal pressure being developed in the form of back pressure at the input connection of a pump associated with a wheel which is in a relatively slipping condition of incipient skid by reason of excess control fluid fed thereto, a brake release valve associated with each wheel cylinder having (a) an inlet port connected to the master cylinder, (b) an outlet port connected to the wheel cylinder, and (c) a control port connected to the input connection of the associated pump, the release valve having a signal piston having a spring for biasing the same into a normal position and progressively movable therefrom in response to signal pressure at the control port, the inlet port being connected to the outlet port when the signal piston is in normal position for normal operation of the brakes by the pedal, and the signal piston having a valve seat which is closed upon initial movement of the piston occurring in response to pressure at the control port for closing off the inlet port to isolate the associated brake from the master cylinder, the release valve having a brake fluid accommodating piston having a spring for biasing the same into a normal position and displaceable therefrom to create a cavity communicating with the outlet port, the brake fluid accommodating piston being located in the path of movement of the signal piston so that upon continued movement of the latter the cavity is progressively enlarged permitting reverse flow of brake fluid from the wheel cylinder into the cavity thereby to relieve the pressure in the wheel cylinder preventing the wheel from going into a full skidding condition, the two pistons being normally slightly spaced end to end to provide a path between the inlet port and the outlet port and in which the initial movement of the signal piston brings the valve seat on the latter into sealing engagement with the end of the brake fluid accommodating piston for closing off the inlet port.

21. In an hydraulic braking system for a vehicle having wheel brakes employing respective wheel cylinders, means including a master cylinder and brake pedal for applying brake fluid to the wheel cylinders in proportion to the pressure exerted on the pedal for braking the vehicle to a stop, a positive displacement hydraulic pump coupled to each wheel, each pump having an input connection and an output connection, the pumps being connected in a series loop circuit charged with control fluid so that the control fluid circulates idly at low pressure in the loop as long as the wheels rotate at the same speed but with signal pressure being developed in the form of back pressure at the input connection of a pump associated with a wheel which is in a relatively slipping condition of incipient skid by reason of excess control fluid fed thereto, a brake release associated with each wheel cylinder having (a) an inlet port connected to the master cylinder, (b) an outlet port connected to the wheel cylinder, and (c) a control port connected to the input connection of the associated pump, the release valve having a signal piston having a spring for biasing the same into a normal position and progressively movable therefrom in response to signal pressure at the control port, the inlet port being connected to the outlet port when the signal piston is in normal position for normal operation of the brakes by the pedal, and the signal piston having a valve seat which is closed upon initial movement of the piston occurring in response to pressure at the control port for closing off the inlet port to isolate the associated brake from the master cylinder, the release valve having a brake fluid accommodating piston having a spring for biasing the same into a normal position and displaceable therefrom to create a cavity communicating with the outlet port, the brake fluid accommodating piston being located in the path of movement of the signal piston so that upon continued movement of the latter the cavity is progressively enlarged permitting reverse flow of brake fluid from the wheel cylinder into the cavity thereby to relieve the pressure in the wheel cylinder preventing the wheel from going into a full skidding condition, the signal piston being in the form of a poppet having an annular seat communicating with the control port and against which the poppet is normally seated, the poppet being so formed that upon leaving the seat additional poppet area is exposed to the fluid at the control port for accelerated movement of the poppet in response to signal pressure.

* * * * *